United States Patent
Jin et al.

(10) Patent No.: US 11,505,873 B2
(45) Date of Patent: Nov. 22, 2022

(54) COPPER FOIL FREE FROM GENERATION OF WRINKLES, ELECTRODE COMPRISING THE SAME, SECONDARY BATTERY COMPRISING THE SAME AND METHOD FOR MANUFACTURING THE SAME

(71) Applicant: KCF Technologies Co., Ltd., Anyang-si (KR)

(72) Inventors: Shan Hua Jin, Anyang-si (KR); An Na Lee, Anyang-si (KR); Seung Min Kim, Anyang-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 179 days.

(21) Appl. No.: 16/631,739

(22) PCT Filed: Jul. 25, 2018

(86) PCT No.: PCT/KR2018/008399
§ 371 (c)(1),
(2) Date: Jan. 16, 2020

(87) PCT Pub. No.: WO2019/027174
PCT Pub. Date: Feb. 7, 2019

(65) Prior Publication Data
US 2020/0181790 A1    Jun. 11, 2020

(30) Foreign Application Priority Data

Jul. 31, 2017   (KR) .......................... 10-2017-0096664

(51) Int. Cl.
C25D 7/04        (2006.01)
C25D 1/04        (2006.01)
(Continued)

(52) U.S. Cl.
CPC ................ *C25D 1/04* (2013.01); *B32B 15/01* (2013.01); *C25D 3/38* (2013.01); *C25D 5/34* (2013.01);
(Continued)

(58) Field of Classification Search
None
See application file for complete search history.

(56) References Cited

U.S. PATENT DOCUMENTS 9,209,485 B2    12/2015  Cheng et al.
2006/0191798 A1 *  8/2006  Sano ..................... H05K 3/384
                                                          205/292
(Continued)

FOREIGN PATENT DOCUMENTS

CN    101935854 A    1/2011
JP    07278867 A    10/1995
(Continued)

OTHER PUBLICATIONS

Supplemental Partial European Search Report for related European Application No. 18841167.2; action dated Mar. 31, 2021; (18 pages).
(Continued)

*Primary Examiner* — Seth Dumbris
(74) *Attorney, Agent, or Firm* — K&L Gates LLP

(57) ABSTRACT

Disclosed is a copper foil including a copper layer having a matte surface and a shiny surface, and an anticorrosive layer disposed on the copper layer, wherein the copper foil has a residual stress of 0.5 to 25 Mpa, based on absolute value, and the copper layer has a plurality of crystal planes, wherein a ratio [TCR (220)] of a texture coefficient (TC) of (220) crystal plane of the copper layer to a total of texture coefficients (TC) of (111), (200), (220) and (311) crystal planes of the copper layer is 5 to 30%.

6 Claims, 4 Drawing Sheets

(51) Int. Cl.
*C25D 3/38* (2006.01)
*C25D 5/34* (2006.01)
*C25D 5/48* (2006.01)
*H01M 4/13* (2010.01)
*H01M 4/66* (2006.01)
*H01M 10/052* (2010.01)
*B32B 15/01* (2006.01)

(52) U.S. Cl.
CPC ............... *C25D 5/48* (2013.01); *H01M 4/13* (2013.01); *H01M 4/66* (2013.01); *H01M 10/052* (2013.01); *Y10T 428/12431* (2015.01)

(56) References Cited

U.S. PATENT DOCUMENTS

| | | | | |
|---|---|---|---|---|
| 2012/0015206 | A1* | 1/2012 | Kim | B32B 15/01 428/606 |
| 2014/0346048 | A1* | 11/2014 | Kohiki | C25D 7/0614 205/50 |
| 2015/0030873 | A1* | 1/2015 | Cheng | H01M 10/0525 428/606 |
| 2015/0267313 | A1* | 9/2015 | Chou | C25D 1/04 205/50 |
| 2015/0325327 | A1* | 11/2015 | Maki | B32B 15/01 428/647 |
| 2016/0260980 | A1 | 9/2016 | Lee et al. | |

FOREIGN PATENT DOCUMENTS

| | | | |
|---|---|---|---|
| JP | 2000182623 A | | 6/2000 |
| JP | 2007131909 A | | 5/2007 |
| JP | 2016050325 A | * | 4/2016 |
| JP | 2016050325 A | | 4/2016 |
| JP | 2016160503 A | | 9/2016 |
| KR | 20100125044 A | | 11/2010 |
| KR | 101154203 B1 | | 6/2012 |
| KR | 20150011751 A | | 2/2015 |
| KR | 20170013182 A | | 2/2017 |
| WO | 98/08361 A1 | | 2/1998 |
| WO | 2009057688 A1 | | 5/2009 |
| WO | 2012001885 A1 | | 1/2012 |
| WO | 2013002273 A1 | | 1/2013 |
| WO | 2016208869 A1 | | 12/2016 |
| WO | 2017018655 A1 | | 2/2017 |

OTHER PUBLICATIONS

Chinese Office Action for related Chinese Application No. 2018800501073; action dated Jul. 1, 2021; (22 pages).
International Search Report for related International Application No. PCT/KR2018/008399; action dated Feb. 7, 2019; (3 pages).
Written Opinion for related International Application No. PCT/KR2018/008399; action dated Feb. 7, 2019; (6 pages).
Supplementary European Search Report for related European Application No. 18841167.2; action dated Jun. 21, 2021; (20 pages).

* cited by examiner

COPPER FOIL FREE FROM GENERATION OF WRINKLES, ELECTRODE COMPRISING THE SAME, SECONDARY BATTERY COMPRISING THE SAME AND METHOD FOR MANUFACTURING THE SAME

CROSS-REFERENCE TO RELATED APPLICATIONS

The present application is a National Stage of International Application No. PCT/KR2018/008399, filed Jul. 25, 2018, which claims priority to Korean Application No. 10-2017-0096664, filed on Jul. 31, 2017, the disclosure of which are incorporated herein by reference.

FIELD OF THE INVENTION

The present disclosure relates to a copper foil free from generation of wrinkles or curls, an electrode including the same, a secondary battery including the same and a method for manufacturing the same.

BACKGROUND OF THE INVENTION

A secondary battery is an energy converter that changes electric energy into chemical energy and stores the chemical energy, and converts the chemical energy back into electric energy when electricity is needed, to generate electricity. A secondary battery is also called a "rechargeable battery" in that it can be charged repeatedly.

Among secondary batteries, a lithium secondary battery has high operation voltage, high energy density and excellent lifespan characteristics. Recent trends towards increasing use of portable electronic devices such as smart phones and notebooks as well as commercialized electric vehicles have brought about rapidly increasing demand for lithium secondary batteries. Such a secondary battery includes an anode current collector made of a copper foil. Among copper foils, electrolyte copper foils are widely used as anode current collectors. In accordance with not only increasing demand for lithium secondary batteries, but also increasing demand for secondary batteries with high capacity, high capacity and high quality, copper foils capable of improving characteristics of secondary batteries are required. In particular, there is a need for copper foils that can impart high capacity to secondary batteries and enable secondary batteries to stably maintain capacity.

Meanwhile, as the thickness of copper foil decreases, the amount of active material contained in the predetermined area may increase, the number of current collectors may increase and the capacity of secondary batteries may thus increase. However, as the thickness of copper foil decreases, curling is readily generated, and an edge of copper foil is curled when the copper foil is rolled, which causes defects such as tears or wrinkles of the copper foil. For this reason, there is difficulty in manufacturing very thin film-type copper foils. Hence, in order to manufacture very thin copper foils, curling of copper foils should be prevented.

Meanwhile, electrolyte copper foils used as anode current collectors have a tensile strength of about 30 to 40 $kgf/mm^2$. To manufacture high-capacity lithium secondary batteries, high-capacity metal or composite active materials have recently attracted attention. Since the metal active materials or composite active materials are greatly volumetrically expanded during charge/discharge, copper foils should withstand volume expansion of the active materials.

Taking these points into consideration, in the step of manufacturing copper foils, as well as in the step of manufacturing electrodes for secondary batteries or the secondary batteries, the copper foils should be free from generation of curls, wrinkles or tears. In particular, during rolling or coating of active materials, in the step of manufacturing copper foils or secondary batteries using the copper foils by a roll-to-roll process, defects, wherein, for example, edges of copper foils are torn, should be prevented.

BRIEF DESCRIPTION OF THE INVENTION

Therefore, the present disclosure has been made in view of the above problems, and the present disclosure is directed to providing a copper foil, an electrode including the same, a secondary battery including the same, and a method for manufacturing the same.

It is one object of the present disclosure to provide a copper foil that is capable of preventing occurrence of curls, wrinkles or tears in the manufacturing process in spite of small thickness thereof. In addition, it is another object of the present disclosure to provide a copper foil that is capable of preventing occurrence of curls, wrinkles or tears in the process of manufacturing an electrode for a secondary battery or the secondary battery using a copper foil.

It is a further object of the present disclosure to provide an electrode for secondary batteries including the copper foil and a secondary battery including the electrode for secondary batteries.

It is another object of the present disclosure to provide a method for manufacturing a copper foil that is capable of preventing occurrence of curls, wrinkles or tears.

Apart from the aspects of the present disclosure mentioned above, other features and advantages of the present disclosure will be described below and would be clearly understood from the description by those skilled in the art.

According to the one embodiment of the present disclosure, curling of a copper foil can be controlled by controlling a crystal orientation of a copper layer constituting the copper foil. In addition, curling of the copper foil can be minimized by reducing residual stress in the copper foil.

In accordance with the present disclosure, the above and other objects can be accomplished by the provision of a copper foil including a copper layer having a matte surface and a shiny surface, and an anticorrosive layer disposed on the copper layer, wherein the copper foil has a residual stress of 0.5 to 25 Mpa, based on absolute value, and the copper layer has a plurality of crystal planes, wherein a ratio [TCR(220)] of a texture coefficient (TC) of (220) crystal plane of the copper layer to a total of texture coefficients (TC) of (111), (200), (220) and (311) crystal planes of the copper layer is 5 to 30%.

The residual stress may be measured in at least one of the (111), (200), (220) and (311) planes.

The residual stress may be measured in the (311) plane.

The copper foil may have an elongation of 2 to 20% after heat-treatment at 130° C. for 30 minutes.

The copper foil may have a first surface corresponding to the direction of the matte surface and a second surface corresponding to the direction of the shiny surface, wherein a difference in surface roughness (Ra) between the first surface and the second surface is 0.5 µm or less.

The copper foil may have a thickness of 4 to 20 µm.

The anticorrosive layer may include at least one of chromium, a silane compound or a nitrogen compound.

In accordance with another aspect of the present disclosure, there is provided an electrode for secondary batteries including the copper foil according to the present disclosure and an active material layer disposed on the copper foil.

In accordance with another aspect of the present disclosure, there is provided a secondary battery including a cathode, an anode facing the cathode, an electrolyte disposed between the cathode and the anode to provide an environment enabling lithium ions to move, and a separator to electrically insulate (isolate) the cathode from the anode, wherein the anode includes the copper foil according to the present disclosure and an active material layer disposed on the copper foil.

In accordance with another aspect of the present disclosure, there is provided a method for manufacturing a copper foil including preparing an electrolyte including copper ions and applying a current density of 30 to 70 ASD (A/dm$^2$) to an electrode plate and a rotary electrode drum spaced from each other in the electrolyte, to form a copper layer, wherein the electrolyte includes 70 to 100 g/L of copper ions, 70 to 150 g/L of sulfuric acid, 1 to 60 ppm of chlorine (Cl), 2 g/L or less of arsenic (As) ions and an organic additive, wherein the organic additive includes at least one of a polishing agent (ingredient A), a speed reducer (ingredient B), a leveling agent (ingredient C) and a roughness regulator (ingredient D), wherein the polishing agent (ingredient A) includes sulfonic acid or a metal salt thereof, the speed reducer (ingredient B) includes a non-ionic water-soluble polymer, the leveling agent (ingredient C) includes at least one of nitrogen (N) and sulfur (S), and the roughness regulator (ingredient D) includes a nitrogen-containing heterocyclic quaternary ammonium salt or a derivative thereof.

The organic additive may have a concentration of 1 to 150 ppm.

The polishing agent includes at least one selected from a bis-(3-sulfopropyl)-disulfide disodium salt (SPS), 3-mercapto-1-propanesulfonic acid, a 3-(N,N-dimethylthiocarbamoyl)-thiopropanesulfonate sodium salt, a 3-[(amino-iminomethyl)thio]-1-propanesulfonate sodium salt, an o-ethyldithiocarbonato-S-(3-sulfopropyl)-ester sodium salt, a 3-(benzothiazolyl-2-mercapto)-propyl-sulfonic acid sodium salt and an ethylenedithiodipropylsulfonic acid sodium salt.

The polishing agent may have a concentration of 1 to 50 ppm.

The speed reducer may include at least one non-ionic water-soluble polymer selected from polyethylene glycol (PEG), polypropylene glycol, a polyethylene-polypropylene copolymer, polyglycerine, polyethylene glycol dimethyl ether, hydroxyethyl cellulose, polyvinyl alcohol, stearic acid polyglycol ether and stearyl alcohol polyglycol ether.

The non-ionic water-soluble polymer may have a number average molecular weight of 500 to 25,000.

The speed reducer may have a concentration of 5 to 50 ppm.

The leveling agent may include at least one selected from thiourea (TU), diethylthiourea, ethylene thiourea, acetylene thiourea, dipropylthiourea, dibutylthiourea, N-trifluoroacetylthiourea, N-ethylthiourea, N-cyanoacetyl thiourea, N-allylthiourea, o-tolylthiourea, N,N'-butylene thiourea, thiazolidinethiol, 4-thiazolinethiol, 4-methyl-2-pyrimidinethiol, 2-thiouracil, 3-(benzotriazole-2-mercapto)-pyrosulfuric acid, 2-mercaptopyridine, 3-(5-mercapto-1H-tetrazole) benzenesulfonate, 2-mercaptobenzothiazole, dimethylpyridine, 2,2'-bipyridine, 4,4'-bipyridine, pyrimidine, pyridazine, pyrinoline, oxazole, thiazole, 1-methylimidazole, 1-benzylimidazole, 1-methyl-2-methylimidazole, 1-benzyl-2-methylimidazole, 1-ethyl-4-methylimidazole, N-methylpyrrole, N-ethylpyrrole, N-butylpyrrole, N-methylpyrroline, N-ethylpyrroline, N-butylpyrroline, purine, quinoline, isoquinoline, N-methylcarbazole, N-ethylcarbazole and N-butylcarbazole.

The leveling agent may have a concentration of 1 to 20 ppm.

The roughness regulator may include at least one of compounds represented by the following Formulae 1 to 5:

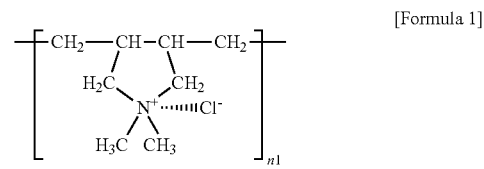
[Formula 1]

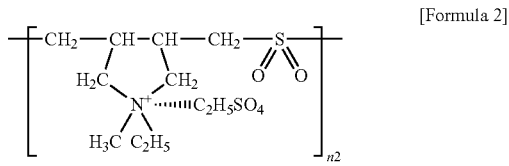
[Formula 2]

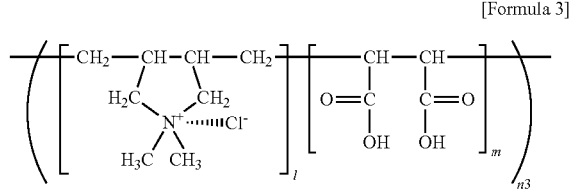
[Formula 3]

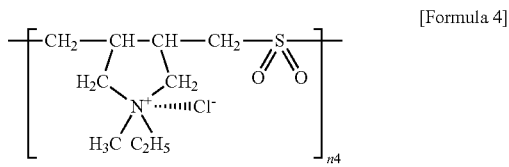
[Formula 4]

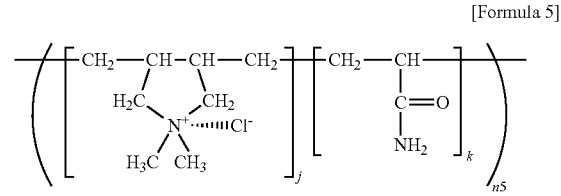
[Formula 5]

wherein j, k, l, m and n1 to n5 each represent repeat units, are an integer of 1 or higher and are identical to or different from one another.

The compounds represented by Formulae 1 to 5 may each have a number average molecular weight of 500 to 50,000.

The roughness regulator may have a concentration of 1 to 30 ppm.

The electrolyte may have a total organic carbon (TOC) concentration of 200 ppm or less.

The step of forming a copper layer may include at least one of filtering the electrolyte through activated carbon, filtering the electrolyte through diatomite, and treating the electrolyte with ozone (O$_3$).

The step of preparing an electrolyte may include heat-treating a copper wire, cleaning the heat-treated copper wire with an acid, cleaning the acid-cleaned copper wire with water, and injecting the water-cleaned copper wire into sulfuric acid for an electrolyte.

The method may further include forming an anticorrosive layer on the copper layer.

The general description of the present disclosure given above is provided only for illustration or description of the present disclosure and should not be construed as limiting the scope of the present disclosure.

According to an embodiment of the present disclosure, the crystal orientation of the copper layer constituting the copper foil is controlled, residual stress in the copper foil is reduced and curl of the copper foil is thus suppressed. As a result, occurrence of curls, wrinkles or tears is prevented in the process of manufacturing the copper foil. In addition, when such a copper foil is used, occurrence of curls, wrinkles or tears in the copper foil is prevented in the process of manufacturing an electrode for a secondary battery or the secondary battery.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
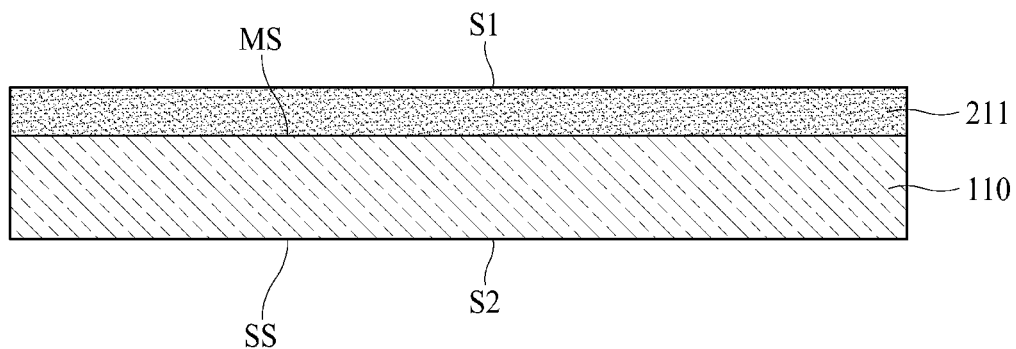
FIG. 1 is a schematic sectional view illustrating a copper foil according to an embodiment of the present disclosure.

Reference will now be made in detail to the preferred embodiments of the present disclosure, examples of which are illustrated in the accompanying drawings.

Those skilled in the art will appreciate that various modifications, additions and substitutions are possible, without departing from the scope and spirit of the disclosure as disclosed in the accompanying claims. Accordingly, the present disclosure encompasses the disclosure defined in the claims and modifications and alterations that fall within the scope of the equivalents thereto.

The shapes, sizes, ratios, angles and numbers disclosed in the drawings for describing embodiments of the present disclosure are merely examples, and thus the present disclosure is not limited to the illustrated details. Like reference numerals refer to like elements throughout the specification.

In the case in which "comprise," "have," and "include" described in the present specification are used, another part may also be present unless "only" is used. The terms in a singular form may include plural forms unless noted to the contrary. In construing an element, the element is construed as including an error region although there is no explicit description thereof.

In describing a positional relationship, for example, when the positional order is described as "on," "above," "below," and "next," the case of no contact therebetween may be included, unless "just" or "direct" is used.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It should be understood that the term "at least one" includes all combinations related with any one item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

FIG. 1 is a schematic sectional view illustrating a copper foil 101 according to an embodiment of the present disclosure.

The copper foil 101 according to the embodiment of the present disclosure includes a copper layer 110. The copper layer 110 has a matte surface MS and a shiny surface SS opposite to the matte surface MS.

Figure 7:
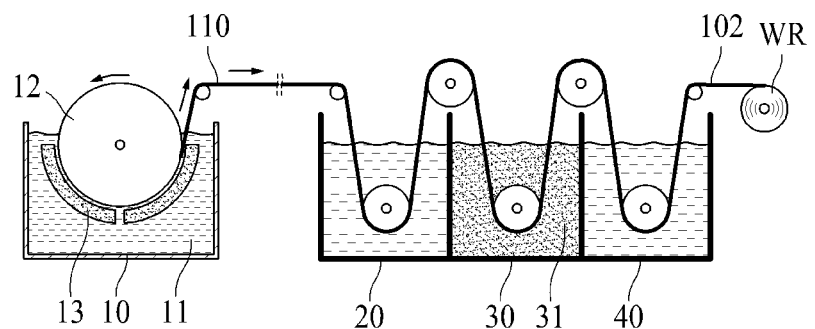
FIG. 7 is a schematic view illustrating a method for manufacturing the copper foil shown in FIG. 3.

The copper layer 110 may be, for example, formed on a rotary electrode drum by electroplating (see FIG. 7). At this time, the shiny surface SS refers to a surface of the copper layer 110 which contacts the rotary electrode drum during electroplating and the matte surface MS refers to a surface which is disposed opposite to the shiny surface SS.

The shiny surface SS generally has a lower surface roughness Rz than that of the matte surface MS, but the embodiment of the present disclosure is not limited thereto. The surface roughness Rz of the shiny surface SS may be equal to or higher than the surface roughness Rz of the matte surface MS. For example, regarding the rotary electrode drum 12 (see FIG. 7) used for manufacturing the copper layer 110, the surface roughness of the shiny surface SS may be lower or higher than the surface roughness Rz of the matte surface MS. The surface of the rotary electrode drum 12 may be polished with a polishing brush having a grit of #800 to #3000.

Referring to FIG. 1, the copper foil 101 may further include an anticorrosive layer 211 disposed on the copper layer 110. The anticorrosive layer 211 may be omitted.

The anticorrosive layer 211 may be disposed on at least one of the matte surface MS or the shiny surface SS of the copper layer 110. Referring to FIG. 1, the anticorrosive layer 211 is disposed on the matte surface MS, but the embodiments of the present disclosure are not limited thereto. That is, the anticorrosive layer 211 may be disposed only on the shiny surface SS, or both on the matte surface MS and the shiny surface SS.

The anticorrosive layer 211 protects the copper layer 110 to prevent the copper layer 110 from being oxidized or denatured upon storage or distribution. Accordingly, the anticorrosive layer 211 is also called a "protective layer".

According to an embodiment of the present disclosure, the anticorrosive layer 211 may include at least one of chromium (Cr), a silane compound or a nitrogen compound.

For example, the anticorrosive layer 211 may be prepared from a chromium (Cr)-containing anticorrosive liquid, that is, a chromate compound-containing anticorrosive liquid.

According to an embodiment of the present disclosure, the copper foil 101 has a first surface S1 which is a surface of the direction of the matte surface MS based on the copper layer 110 and a second surface S2 which is a surface of the direction of the shiny surface SS. Referring to FIG. 1, the first surface S1 of the copper foil 101 is a surface of the anticorrosive layer 211 and the second surface S2 thereof is the shiny surface SS. According to an embodiment of the present disclosure, the anticorrosive layer 211 may be omitted. When the anticorrosive layer 211 is omitted, the matte surface MS of the copper layer 110 corresponds to the first surface S1 of the copper foil 101.

According to an embodiment of the present disclosure, the copper layer has a plurality of crystal planes and a ratio of a texture coefficient (TC) of (220) crystal plane of the copper layer to a total of texture coefficients (TCs) of (111), (200), (220) and (311) planes, which are crystal planes of the copper layer, is 5 to 30%.

More specifically, the copper layer 110 has a plurality of crystal planes and the crystal planes can be represented by Miller indices. Specifically, the crystal planes of the copper layer 110 can be represented by (hkl) planes. These crystal planes each have texture coefficients (TC), which can be measured or calculated by X-ray diffraction (XRD).

Hereinafter, referring to FIG. 2A, a method for measuring and calculating texture coefficients of crystal planes of the copper layer 110 constituting the copper foil 101 will be described below.

Figure 2A:
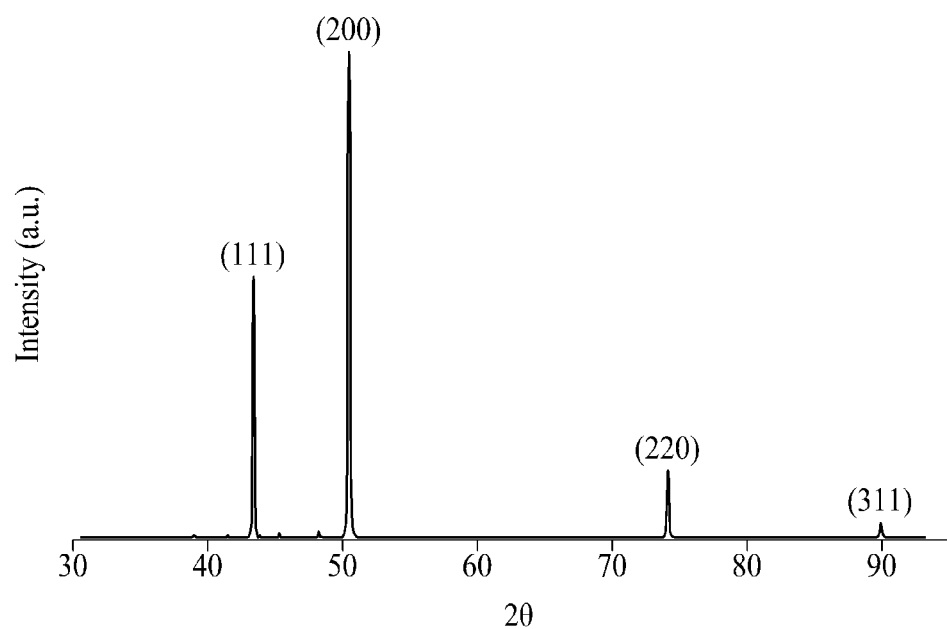
FIG. 2A shows an example of an XRD graph of the copper foil.

FIG. 2A shows an example of an XRD graph of a copper foil. More specifically, FIG. 2A is an XRD graph of the copper layer 110 constituting the copper foil 101. The peaks of FIG. 2A each correspond to crystal planes.

For measurement of texture coefficients (TCs), first, an XRD graph having peaks corresponding to n crystal planes is obtained by X-ray diffraction (XRD) in a diffraction angle (2θ) range of 30° to 95° [Target: copper K alpha 1, 2θ interval: 0.01°, 2θ scan speed: 3°/min]. For example, referring to FIG. 2A, an XRD graph including four peaks corresponding to (111), (200), (220) and (311) planes is obtained. In this case, n is 4.

Then, XRD diffraction intensity [I(hkl)] of each crystal plane (hkl) is obtained from this graph. In addition, XRD diffraction intensities [$I_0$(hkl)] of n respective crystal planes of a standard copper powder regulated by Joint Committee on Powder Diffraction Standards (JCPDS) are obtained. Subsequently, the arithmetic mean value of "I(hkl)/$I_0$(hkl)" of n crystal planes is calculated.

For example, the texture coefficient of (111) plane [TC(111)] of the copper layer 110 is obtained by dividing I(111)/$I_0$(111) of the (111) plane by the arithmetic mean value. That is, the texture coefficient of (111) plane [TC(111)] is calculated based on the following Equation 1:

$$TC(111) = \frac{\frac{I(111)}{I_0(111)}}{\frac{1}{n}\Sigma \frac{I(hkl)}{I_0(hkl)}} \quad [\text{Equation 1}]$$

In the same manner, the texture coefficient of (200) plane [TC(200)] is calculated based on the following Equation 2:

$$TC(200) = \frac{\frac{I(200)}{I_0(200)}}{\frac{1}{n}\Sigma \frac{I(hkl)}{I_0(hkl)}} \quad [\text{Equation 2}]$$

In the same manner, the texture coefficient of (220) plane [TC(220)] is calculated based on the following Equation 3:

$$TC(220) = \frac{\frac{I(220)}{I_0(220)}}{\frac{1}{n}\Sigma \frac{I(hkl)}{I_0(hkl)}} \quad [\text{Equation 3}]$$

In the same manner, the texture coefficient of (311) plane [TC(311)] is calculated based on the following Equation 4:

$$TC(311) = \frac{\frac{I(311)}{I_0(311)}}{\frac{1}{n}\Sigma \frac{I(hkl)}{I_0(hkl)}} \quad [\text{Equation 4}]$$

According to an embodiment of the present disclosure, a ratio of a texture coefficient (TC) of (220) crystal plane of the copper layer to a total of texture coefficients (TC) of (111), (200), (220) and (311) planes of crystal planes of the copper layer 110 is designated by TCR(220) and the TCR (220) can be calculated in accordance with the following Equation 5:

$$TCR(220) = \frac{TC(220)}{TC(111) + TC(200) + TC(220) + TC(311)} \quad [\text{Equation 5}]$$

When the ratio of a texture coefficient (TC) of (220) plane [TC(220)] of the copper layer to a total of texture coefficients (TC) of (111), (200), (220) and (311) planes of the copper layer 110 [TCR(220)] is less than 5%, growth of (111) and (200) planes in the copper layer 110 is relatively facilitated, and the (111) and (200) planes are first orientated, thus causing the crystal texture of the copper layer 110 to be excessively fine and increasing incorporation of impurities. As a result, the residual stress of the copper foil 101 may be increased and curling of the copper foil 101 may be increased.

When the ratio of a texture coefficient (TC) of (220) plane [TC(220)] of the copper layer to a total of texture coefficients (TC) of (111), (200), (220) and (311) planes of the copper layer 110 [TCR (220)] is higher than 30%, growth of (111) and (200) planes in the copper layer 110 is relatively deteriorated, the fine crystal texture of the copper layer 110 is reduced and the strength of the copper foil 101 is thus decreased.

For this reason, according to an embodiment of the present disclosure, regarding the crystal structure of the copper layer 110, the ratio of a texture coefficient (TC) of (220) plane [TC(220)] to a total of texture coefficients (TC) of (111), (200), (220) and (311) planes [TCR(220)] is adjusted in the range of 5 to 30%.

As such, according to an embodiment of the present disclosure, by controlling the crystal orientation of the copper layer 110, curling of the copper foil 101 can be prevented and, as a result, wrinkling of the copper foil 101 can be prevented.

According to an embodiment of the present disclosure, the copper foil 101 has a residual stress of 0.5 to 25 Mpa, based on absolute value.

Residual stress refers to stress that remains in an object, although no external force is applied to the object. The residual stress may be stress generated in a processed or heat-treated object and be present in the form of tensile stress or compressive stress in the object depending on treatment method applied to the object. Such residual stress may cause the object to be broken or damaged.

When the copper foil 101 has a great residual stress, based on absolute value, curling of the copper foil becomes worse. Since the phenomenon of curling seriously occurs in thin film-type copper foils, it is important to control the phenomenon of curling in the process of producing thin film-type copper foils.

According to an embodiment of the present disclosure, curling of the copper foil is prevented by controlling the residual stress of the copper foil.

Specifically, a residual stress having a positive value indicates presence of tensile stress in the copper foil 101, while a residual stress having a negative value indicates presence of compressive stress in the copper foil 101. Depending on the composition of organic additive used in the process of manufacturing the copper foil 101, the copper foil may have a tensile stress- or compressive stress-type residual stress.

When the residual stress of the copper foil 101 is lower than 0.5 Mpa, the surface of the copper foil 101 may become rough due to non-uniformity of crystal cross-sectional surfaces during plating for forming the copper layer 110. In this case, in the process of manufacturing an electrode for secondary batteries using the copper foil 101, the surface of the copper foil 101 may not be uniformly coated with an active material and charge/discharge capacity maintenance or stability of secondary batteries may be deteriorated.

Due to partial incorporation of hydrogen or self-growth of crystal grains during plating for manufacturing the copper layer 110 constituting the copper foil 101, the copper foil 101 can have a residual stress of 0.5 Mpa or more, based on absolute value. When the absolute value of the residual stress of the copper foil 101 is higher than 25 Mpa, in the process of manufacturing secondary batteries, the copper foil 101 may be curled, wrinkled or the like, which causes deterioration in workability and increased defects of secondary batteries.

Hence, according to an embodiment of the present disclosure, the residual stress of the copper foil 101 is adjusted in the range of 0.5 to 25 Mpa, based on absolute value. For this purpose, the crystal orientation of the copper layer 110 can be regulated. That is, according to an embodiment of the present disclosure, the TCR (220) of the copper layer 110 is adjusted to the range of 5 to 30%, so that the residual stress of the copper foil 101 can be adjusted to the range of 0.5 to 25 Mpa, based on absolute value.

The residual stress of the copper foil 101 can be measured on at least one of crystal planes of the copper layer 110. That is, residual stress measured on at least one of crystal planes of the copper layer 110 may be the residual stress of the copper foil 101. For example, the residual stress of the copper foil 101 is measured in at least one of (111), (200), (220) and (311) planes of crystal planes of the copper layer 110. That is, the residual stress of the copper foil 101 measured in at least one of (111), (200), (220) and (311) planes may be the residual stress of the copper foil 101.

According to an embodiment of the present disclosure, the residual stress of the copper foil 101 can be measured with an X-ray diffraction (XRD) residual stress measurement device. More specifically, the residual stress of respective crystal planes of the copper layer 110 can be measured with a residual stress measurement device using X-ray diffraction (XRD) of crystal planes of the copper layer 110.

Figure 2B:
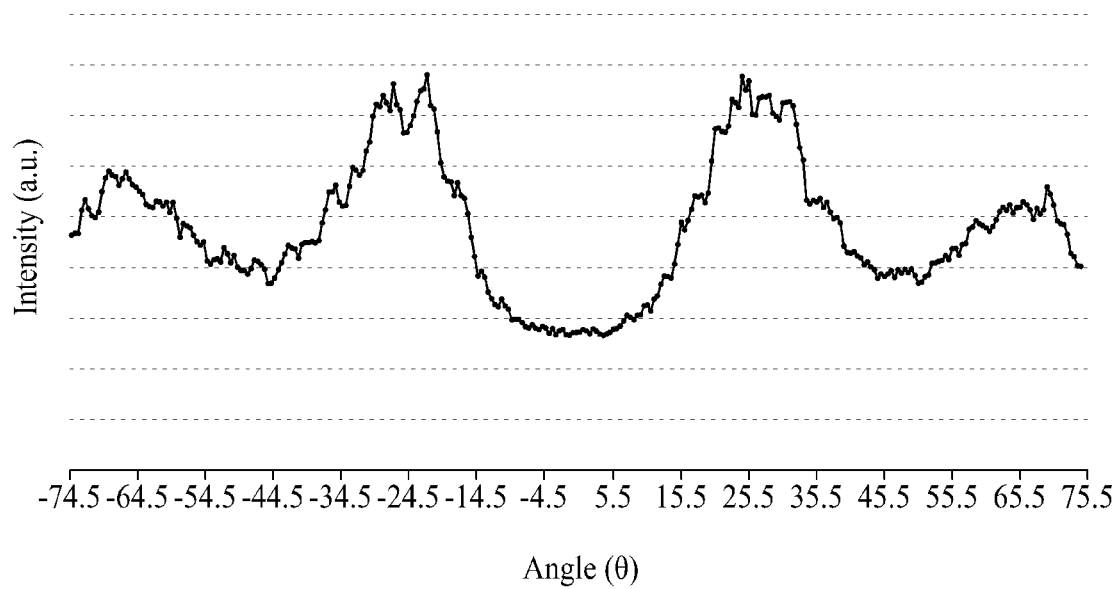
FIG. 2B shows an example of an XRD graph showing residual stress in the copper foil.

For example, the residual stress of the copper foil 101 may be measured using D8 DISCOVER™ available from Bruker Corporation, as the X-ray diffraction (XRD) residual stress measurement device. At this time, X-ray diffraction analysis conditions are set as follows:

Target: 3 kW X-ray tube with Cu target
Power: 40 kV, 40 mA
Wavelength: 1.5406 Å
Measurement range: 30 to 100 degrees
Scan axis: Theta-2Theta
Scan speed: 2 deg/min FIG. 2B shows an example of an XRD graph regarding a residual stress in the copper foil. In particular, FIG. 2B illustrates XRD results for measurement of the residual stress of (311) plane of the copper layer 110.

Upon measurement of residual stress, any one is selected from crystal planes of copper and residual stress is measured in the plane at a constant 2θ while changing only θ within 360°. Residual stress can be measured in each of (111), (200), (220) and (311) planes, four main crystal planes of the copper layer 110.

In particular, in the XRD graph, the residual stress of the crystal plane having low intensity, yet good resolution may be measured and the measured value may be determined to be residual stress of the copper foil 101. For example, the (311) plane of the copper layer 110 has an excellent measurement resolution and a high reliability at a high angle. Accordingly, the residual stress measured in the (311) plane of the copper layer 110 may be the residual stress of the copper foil 101.

According to an embodiment of the present disclosure, the copper foil 101 has an elongation of 2 to 20% after heat-treating at 130° C. for 30 minutes. The elongation may be measured with a universal testing machine (UTM) in accordance with the regulations of the IPC-TM-650 test method manual. According to an embodiment of the present disclosure, the elongation is measured with a universal testing machine available from Instron corporation. At this time, the width of a sample for measuring elongation is 12.7 mm, the distance between grips is 50 mm and the measurement speed is 50 mm/min.

When the elongation of the copper foil 101 is less than 2% after heat-treating at 130° C. for 30 minutes, the copper foil 101 cannot sufficiently extend in response to great volumetric expansion of an active material for high capacity when used as a current collector for secondary batteries, and thus be torn. On the other hand, when the elongation is excessively high, that is, higher than 20%, the copper foil 101 is readily extended in the process of manufacturing an electrode for secondary batteries, which may cause the electrode to be deformed.

In addition, the copper foil 101 may have an elongation of 2 to 20% at room temperature of 25±15° C.

According to an embodiment of the present disclosure, the copper foil 101 has a difference in surface roughness Ra between the first surface S1 and the second surface S2, of 0.5 µm or less.

The surface roughness Ra according to an embodiment of the present disclosure is referred to as an "arithmetic average roughness". In the surface roughness profile, the surface roughness Ra is determined by calculating a total area of upper and lower parts from the center line of a measurement region (base length) and dividing the total area by the length of the measurement area. Surface roughness Ra may be measured using a surface roughness measurement device (M300, Mahr) in accordance with specifications of JIS B 0601-2001.

In the case where the difference in surface roughness Ra between the first surface S1 and the second surface S2 of the copper foil 101 is higher than 0.5 μm, when the copper foil 101 is used as a current collector for electrodes for secondary batteries, due to the difference in surface roughness Ra between the first surface S1 and the second surface S2, the active material is not uniformly coated on both surfaces of the first surface S1 and the second surface S2. As a result, upon charge/discharge of secondary batteries, differences in electric and physical properties between both the surfaces S1 and S2 may occur, which may cause deterioration in capacity maintenance rate and lifespan of secondary batteries.

In addition, according to an embodiment of the present disclosure, the first surface S1 and the second surface S2 of the copper foil 101 may each have a surface roughness Ra, of not less than 0.12 μm and not more than 0.86 μm.

According to an embodiment of the present disclosure, the copper foil 101 has a thickness of 4 μm to 20 μm. When the copper foil 101 is used as a current collector of an electrode for secondary batteries, reduced thickness of the copper foil 101 enables more current collects to be accommodated in the same area, which is advantageous for providing high capacity of secondary batteries. However, when the thickness of the copper foil 101 is less than 4 μm, workability is deteriorated in the process of manufacturing an electrode for secondary batteries or the secondary batteries using the copper foil 101.

Meanwhile, when the thickness of the copper foil 101 is higher than 20 μm, the thickness of the electrode for secondary batteries using the copper foil 101 is increased and the increased thickness may make it difficult to impart high capacity to secondary batteries.

Figure 3:
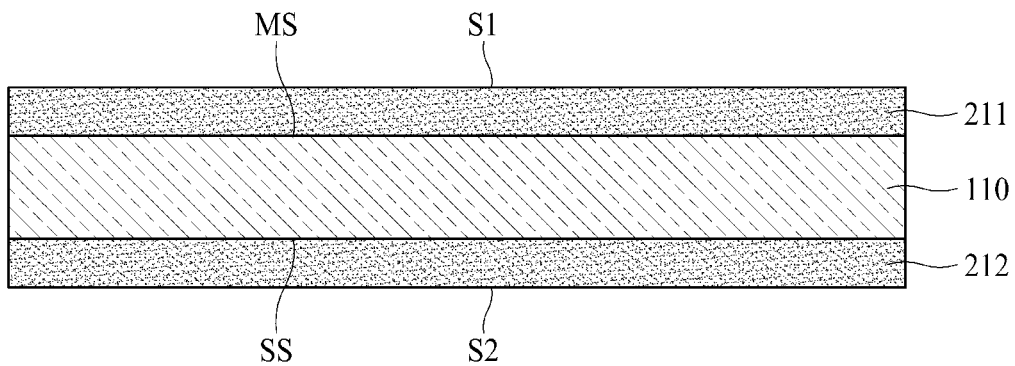
FIG. 3 is a schematic sectional view illustrating a copper foil according to another embodiment of the present disclosure.

FIG. 3 is a schematic sectional view illustrating a copper foil 102 according to another embodiment of the present disclosure. Hereinafter, description of constituent components given above will be omitted to avoid repetition.

Referring to FIG. 3, the copper foil 102 according to another embodiment of the present disclosure includes a copper layer 110, and two anticorrosive layers 211 and 212 respectively disposed on the matte surface MS and the shiny surface SS of the copper layer 110. Compared with the copper foil 101 shown in FIG. 1, the copper foil 102 shown in FIG. 3 further includes the anticorrosive layer 212 disposed on the shiny surface SS of the copper layer 110.

For convenience of description, among two anticorrosive layers 211 and 212, the anticorrosive layer 211 disposed on the matte surface MS of the copper layer 110 is referred to as a "first protective layer" and the anticorrosive layer 212 disposed on the shiny surface SS is referred to as a "second protective layer".

In addition, the copper foil 102 shown in FIG. 3 has a first surface S1, which is a surface of the direction of the matte surface MS, based on the copper layer 110, and a second surface S2 which is a surface of the direction of the shiny surface SS. Here, the first surface S1 of the copper foil 102 corresponds to the surface of the anticorrosive layer 211 disposed on the matte surface MS, and the second surface S2 corresponds to the surface of the anticorrosive layer 212 disposed on the shiny surface SS.

According to another embodiment of the present disclosure, each of two anticorrosive layers 211 and 212 may include at least one of chromium (Cr), a silane compound and a nitrogen compound.

The copper layer 110 of the copper foil 102 shown in FIG. 3 has a crystal structure and a ratio [TCR(220)] of a texture coefficient (TC) of (220) plane [TC(220)] to a total texture coefficient (TC) of (111), (200), (220) and (311) planes, of 5 to 30%.

The copper foil 102 has a residual stress of 0.5 to 25 Mpa, based on absolute value. The residual stress may be measured in at least one of (111), (200), (220) and (311) plans of crystal planes of the copper layer 110. More specifically, the residual stress may be measured in the (311) plane.

The copper foil 102 has an elongation of 2 to 20% after heat-treating at 130° C. for 30 minutes and has a difference in surface roughness Ra between the first surface S1 and the second surface S2, of 0.5 μm or less.

The copper foil 102 shown in FIG. 3 has a thickness of 4 μm to 30 μm.

Figure 4:
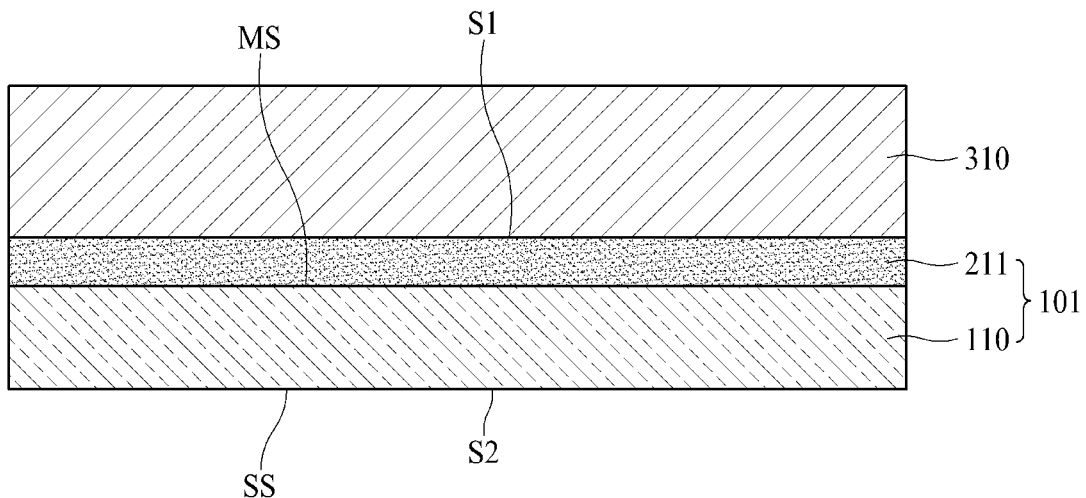
FIG. 4 is a schematic sectional view illustrating an electrode for secondary batteries according to another embodiment of the present disclosure.

FIG. 4 is a schematic sectional view illustrating an electrode 103 for secondary batteries according to another embodiment of the present disclosure. The electrode 103 for secondary batteries shown in FIG. 4 may be, for example, applied to the secondary battery 105 shown in FIG. 6.

Referring to FIG. 4, the electrode 103 for secondary batteries according to another embodiment of the present disclosure includes a copper foil 101 and an active material layer 310 disposed on the copper foil 101. In this case, the copper foil 101 includes a copper layer 110 and an anticorrosive layer 211 disposed on the copper layer 110, and is used as a current collector.

Specifically, the copper foil 101 has a first surface S1 and a second surface S2, and the active material layer 310 is disposed on at least one of the first surface S1 and the second surface S2. The active material layer 310 may be disposed on the anticorrosive layer 211.

FIG. 4 shows an example in which the copper foil 101 of FIG. 1 is used as a current collector. However, another embodiment of the present disclosure is not limited thereto and the copper foil 102 shown in FIG. 3 may be used as a current collector of the electrode 103 for secondary batteries.

In addition, the configuration in which the active material layer 310 is disposed only on the first surface S1 of the copper foil 100 is illustrated in FIG. 4, but other embodiments of the present disclosure are not limited thereto. The active material layer 310 may be disposed on both the first surface S1 and the second surface S2 of the copper foil 101. In addition, the active material layer 310 may be disposed only on the second surface S2 of the copper foil 101.

The active material layer 310 shown in FIG. 4 includes an electrode active material, in particular, an anode active material. That is, the electrode 103 for secondary batteries shown in FIG. 4 may be used as an anode.

The active material layer 310 may include at least one of carbon, a metal, a metal oxide, or a composite of a metal and carbon. The metal may include at least one of Ge, Sn, Li, Zn, Mg, Cd, Ce, Ni or Fe. In addition, in order to increase charge/discharge capacity of secondary batteries, the active material layer 310 may include silicon (Si).

The repeated charge/discharge of secondary batteries causes the active material layer 310 to be alternately shrink and expand, which results in separation of the active material layer 310 and the copper foil 100, and deterioration in charge/discharge efficiency of the secondary battery. In particular, the active material layer 310 including silicon (Si) undergoes significant expansion and shrinkage.

According to another embodiment of the present disclosure, the copper foil 101 used as a current collector can shrink and expand in response to shrinkage and expansion of the active material layer 310 and thus is neither deformed nor torn, although the active material layer 310 shrinks and expands. As a result, separation between the copper foil 101 and the active material layer 310 does not occur. Hence, a secondary battery including the electrode 103 for secondary batteries has excellent charge/discharge efficiency and superior capacity maintenance rate.

Figure 5:
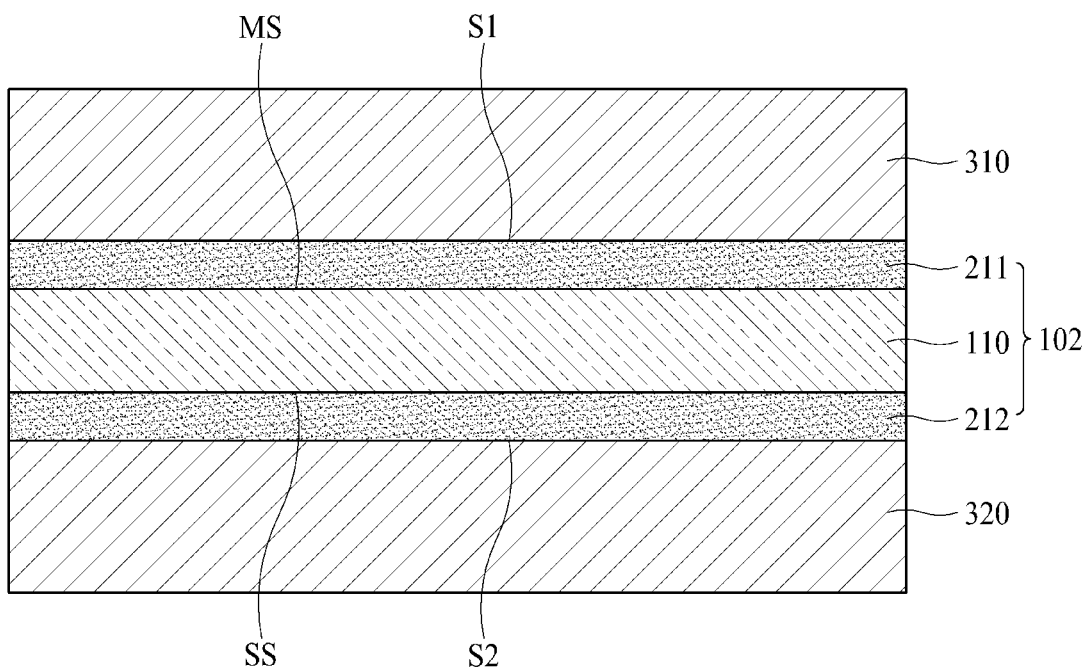
FIG. 5 is a schematic sectional view illustrating an electrode for secondary batteries according to another embodiment of the present disclosure.

FIG. 5 is a schematic sectional view illustrating an electrode 104 for secondary batteries according to another embodiment of the present disclosure.

The electrode 104 for secondary batteries according to another embodiment of the present disclosure includes a copper foil 102, and active material layers 310 and 320 disposed on the copper foil 102. The copper foil 102 includes a copper layer 110, and two anticorrosive layers 211 and 212 disposed on opposite surfaces of the copper layer 110.

Specifically, the electrode 104 for secondary batteries shown in FIG. 5 includes two active material layers 310 and 320 each disposed on the first surface S1 and the second surface S2 of the copper foil 102. Here, the active material layer 310 disposed on the first surface S1 of the copper foil 102 is referred to as a "first active material layer" and the active material layer 320 disposed on the second surface S2 of the copper foil 102 is referred to a "second active material layer".

The two active material layers 310 and 320 can be produced in the same manner and using the same material, or in different manners and using different materials.

Figure 6:
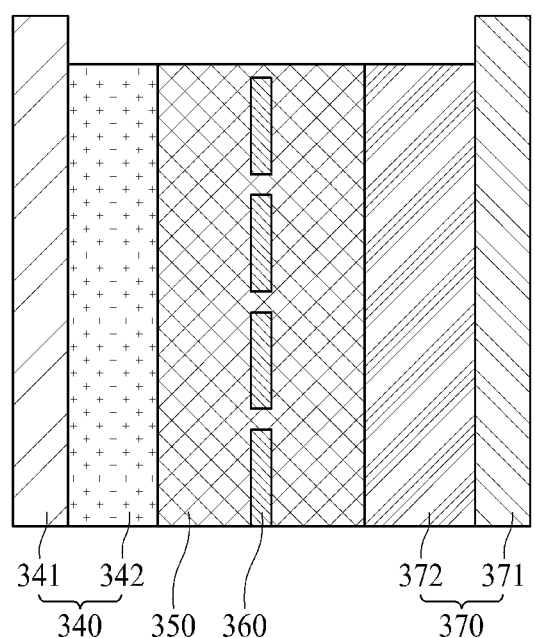
FIG. 6 is a schematic sectional view illustrating a secondary battery according to another embodiment of the present disclosure.

FIG. 6 is a schematic sectional view illustrating a secondary battery 105 according to another embodiment of the present disclosure. The secondary battery 105 shown in FIG. 6 is, for example, a lithium secondary battery.

Referring to FIG. 6, the secondary battery 105 includes a cathode 370, an anode 340 facing the cathode 370, an electrolyte 350 disposed between the cathode 370 and the anode 340 to provide an environment enabling ions to move, and a separator 360 to electrically insulate (isolate) the cathode 370 from the anode 340. Here, the ions that pass through the cathode 370 and the anode 340 are for example lithium ions. The separator 360 separates the cathode 370 from the anode 340 to prevent current charges generated at one electrode via the secondary battery 105 from moving to another electrode and then being unnecessarily consumed. Referring to FIG. 6, the separator 360 is disposed in the electrolyte 350.

The cathode 370 includes a cathode current collector 371 and a cathode active material layer 372. The cathode current collector 371 may be an aluminum foil.

The anode 340 includes an anode current collector 341 and an active material layer 342. The active material layer 342 of the anode 340 includes an anode active material.

The copper foil 101 or 102 shown in FIG. 1 or 3 may be used as the anode current collector 341. In addition, the electrode 103 or 104 for secondary batteries shown in FIG. 4 or 5, respectively, may be used as the anode 340 of the secondary battery 105 shown in FIG. 6.

Hereinafter, a method for manufacturing a copper foil 102 according to another embodiment of the present disclosure will be described in detail with reference to FIG. 7.

FIG. 7 is a schematic view illustrating a method for manufacturing a copper foil 102 shown in FIG. 3.

In order to manufacture the copper foil 102, first, an electrolyte 11 containing copper ions is prepared. The electrolyte 11 is accommodated in an electrolyte bath 10.

Then, a current density of 30 to 70 ASD (A/dm$^2$) is applied to an electrode plate 13 and a rotary electrode drum 12 spaced from each other in an electrolyte 11 to form a copper layer 110. The copper layer 110 is formed by electroplating. The gap between the electrode plate 13 and the rotary electrode drum 12 can be adjusted in the range of 8 to 13 mm.

When the current density applied to the electrode plate 13 and the rotary electrode drum 12 is less than 30 ASD, production of crystal grains is facilitated in the copper layer 110, and when the current density is higher than 70 ASD, crystal grains rapidly become finer. More specifically, the current density may be adjusted to 40 ASD or more.

Surface characteristics of the shiny surface SS of the copper layer 110 can be changed depending on buffing or polishing degree of the surface of the rotary electrode drum 12. In order to control surface characteristics of the shiny surface SS of the copper layer 110, for example, the surface of the rotary electrode drum 12 may be polished with a brush having a grit of #800 to #3000.

In the step of forming the copper layer 110, the electrolyte 11 is maintained at a temperature of 40 to 70° C. More specifically, the temperature of the electrolyte 11 is maintained at 50° C. or more. At this time, the composition of the electrolyte 11 is controlled, so that physical, chemical and electric properties of the copper layer 110 can be controlled.

According to an embodiment of the present disclosure, the electrolyte 11 includes 70 to 100 g/L of copper ions, 70 to 150 g/L of sulfuric acid, 1 to 60 ppm of chlorine (Cl), 2 g/L or less of arsenic (As) ions and an organic additive.

To facilitate formation of the copper layer 110 through copper plating, the concentrations of copper ions and sulfuric acid in the electrolyte 11 are adjusted to 70 to 100 g/L and 70 to 150 g/L, respectively.

According to one embodiment of the present invention, chlorine (Cl) includes all of chlorine ions (Cl$^-$) and chlorine atoms present in a molecule. Chlorine (Cl) can, for example, be used to remove silver (Ag) ions incorporated into the electrolyte 11 in the process of forming the copper layer 110. Specifically, chlorine (Cl) induces precipitation of silver (Ag) ions in the form of silver chloride (AgCl). The silver chloride (AgCl) can be removed by filtration.

When the concentration of chlorine (Cl) is less than 1 ppm, silver (Ag) ions cannot be removed well. On the other hand, when the concentration of chlorine (Cl) is higher than 60 ppm, unnecessary reaction may occur due to the excessive chlorine (Cl). Accordingly, the concentration of chlorine (Cl) in the electrolyte 11 is controlled to the range of 1 to 60 ppm. More specifically, the concentration of chlorine (Cl) may be controlled to 25 ppm or less, for example, the range of 5 to 25 ppm.

The concentration of arsenic (As) ions in the electrolyte 11 is controlled to 2 g/L or less. The arsenic (As) in the electrolyte 11 may be, for example, present as a trivalent ion (As$^{3+}$), but one embodiment of the present disclosure is not limited thereto.

Arsenic (As) ions function as an accelerator to facilitate reduction reaction of copper (Cu) within a predetermined concentration range. When the concentration of arsenic (As) ions is 2 g/L or less, in the step of forming the copper layer 110, the (220) plane is first grown, based on crystal planes.

On the other hand, when the concentration of arsenic (As) ions is higher than 2 g/L, insoluble compounds may be produced during reduction of copper ions such as Cu$^{2+}$ or Cu⁺ into copper (Cu) and may be deposited (incorporated) together with impurities on the copper layer 110. In addition, when the concentration of arsenic (As) ions is high, in the step of forming the copper layer 110, (311), (111) and (100) planes, based on crystal planes, may be grown first, while growth of the (220) plane may be suppressed.

Accordingly, in order to adjust the ratio of a texture coefficient (TC) of (220) plane [TC(220)] to a total of texture coefficients (TC) of (111), (200), (220) and (311) planes [TCR(220)] to the range of 5 to 30%, in the crystal structure of the copper layer 110, the concentration of arsenic (As) ions in the electrolyte 11 is adjusted to 2 g/L or less.

Meanwhile, according to an embodiment of the present disclosure, for crystal orientation of the copper layer 110, arsenic (As) ions in the electrolyte 11 may have a concentration of 0.1 g/L or more. That is, arsenic (As) ions in the electrolyte 11 may have a concentration of 0.1 to 2 g/L.

The organic additive included in the electrolyte 11 includes at least one of a polishing agent (ingredient A), a speed reducer (ingredient B), a leveling agent (ingredient C) or a roughness regulator (ingredient D). The organic additive in the electrolyte 11 has a concentration of 1 to 150 ppm.

The organic additive may include two or more of the polishing agent (ingredient A), the speed reducer (ingredient B), the leveling agent (ingredient C) or the roughness regulator (ingredient D), and may include all of the four ingredients. In any case, the concentration of the organic additive is 150 ppm or less. When the organic additive includes all of the polishing agent (ingredient A), the speed reducer (ingredient B), the leveling agent (ingredient C) and the roughness regulator (ingredient D), the organic additive may have a concentration of 10 to 150 ppm.

The polishing agent (ingredient A) includes sulfonic acid or a metal salt thereof. The polishing agent (ingredient A) may have a concentration of 1 to 50 ppm in the electrolyte 11.

The polishing agent (ingredient A) can increase the amount of electric charges of the electrolyte 11 to improve the plating speed of copper, and can enhance curl characteristics of the copper foil and luster of the copper foil 102. When the concentration of polishing agent (ingredient A) is less than 1 ppm, the luster of the copper foil 102 is deteriorated and, when the concentration is higher than 50 ppm, roughness of the copper foil 102 may be improved and strength thereof may be deteriorated.

More specifically, the polishing agent (ingredient A) may have a concentration of 5 to 30 ppm in the electrolyte 11.

The polishing agent includes, for example, at least one selected from a bis-(3-sulfopropyl)-disulfide disodium salt (SPS), 3-mercapto-1-propanesulfonic acid, a 3-(N,N-dimethylthiocarbamoyl)-thiopropanesulfonate sodium salt, a 3-[(amino-iminomethyl)thio]-1-propanesulfonate sodium salt, an o-ethyldithiocarbonato-S-(3-sulfopropyl)-ester sodium salt, a 3-(benzothiazolyl-2-mercapto)-propyl-sulfonic acid sodium salt and an ethylenedithiodipropylsulfonic acid sodium salt.

The speed reducer (ingredient B) includes a non-ionic water-soluble polymer. The speed reducer (ingredient B) may have a concentration of 5 to 50 ppm in the electrolyte 11.

The speed reducer (ingredient B) reduces the plating speed of copper to prevent a rapid increase in roughness and deterioration in strength of the copper foil 102. Such a speed reducer (ingredient B) is also called an "inhibitor" or "suppressor".

When the concentration of the speed reducer (ingredient B) is lower than 5 ppm, there may occur problems in which the roughness of the copper foil 102 is rapidly increased and the strength of the copper foil 102 is deteriorated. On the other hand, although the concentration of speed reducer (ingredient B) is higher than 50 ppm, there is almost no variation in physical properties such as appearance, luster, roughness, strength and elongation of the copper foil 102. Accordingly, without increasing manufacturing costs and wasting raw materials due to unnecessary increase in concentration of the speed reducer (ingredient B), the concentration of the speed reducer (ingredient B) can be adjusted to the range of 5 to 50 ppm.

The speed reducer (ingredient B) may, for example, include at least one non-ionic water-soluble polymer selected from polyethylene glycol (PEG), polypropylene glycol, a polyethylene-polypropylene copolymer, polyglycerine, polyethylene glycol dimethyl ether, hydroxyethyl cellulose, polyvinyl alcohol, stearic acid polyglycol ether and stearyl alcohol polyglycol ether. However, the type of the speed reducer is not limited thereto and other non-ionic water-soluble polymers that can be used to manufacture the high-strength copper foil 102 can be used as a speed reducer.

The non-ionic water-soluble polymer used as the speed reducer (ingredient B) may have a number average molecular weight of 500 to 25,000. When the number average molecular weight of the speed reducer (ingredient B) is lower than 500, the effects of the speed reducer (ingredient B) on preventing a rapid increase in roughness and a deterioration in strength of the copper foil 102 are insufficient and, when the molecular weight of ingredient B is higher than 25,000, the copper layer 110 cannot be readily formed due to high molecular weight of the speed reducer (ingredient B).

More specifically, the non-ionic water-soluble polymer used as the speed reducer (ingredient B) may have a molecular weight of 1,000 to 10,000.

The leveling agent (ingredient C) includes at least one of nitrogen (N) and sulfur (S). That is, the leveling agent (ingredient C) may include one or more nitrogen atoms (N), or one or more sulfur atoms (S) in one molecule and may include one or more nitrogen atoms (N) and one or more sulfur atoms (S). For example, the leveling agent (ingredient C) is an organic compound including at least one of nitrogen (N) and sulfur (S).

The leveling agent (ingredient C) prevents formation of excessively high peaks or excessively large protrusions in the copper layer 110 to enable the copper layer 110 to be entirely even. The leveling agent (ingredient C) may have a concentration of 1 to 20 ppm in the electrolyte 11.

When the concentration of the leveling agent (ingredient C) is less than 1 ppm, the strength of the copper foil 102 is deteriorated, which makes it difficult to manufacture a high-strength copper foil 102. On the other hand, when the concentration of the leveling agent (ingredient C) is higher than 20 ppm, strength may be deteriorated due to excessively increased surface roughness of the copper foil 102, and separation of the manufactured copper foil 102 from a winder (WR) may be difficult due to pinholes or curl generated on the surface of the copper foil 102.

The leveling agent (ingredient C) may include, for example, at least one selected from thiourea (TU), diethylthiourea, ethylene thiourea, acetylene thiourea, dipropylthiourea, dibutylthiourea, N-trifluoroacetylthiourea, N-ethylthiourea, N-cyanoacetyl thiourea, N-allylthiourea, o-tolylthiourea, N,N'-butylene thiourea, thiazolidinethiol, 4-thiazolinethiol, 4-methyl-2-pyrimidinethiol, 2-thiouracil, 3-(benzotriazole-2-mercapto)-pyrosulfuric acid, 2-mercaptopyridine, 3-(5-mercapto-1H-tetrazole)benzenesulfonate, 2-mercaptobenzothiazole, dimethylpyridine, 2,2'-bipyridine, 4,4'-bipyridine, pyrimidine, pyridazine, pyrinoline, oxazole, thiazole, 1-methylimidazole, 1-benzylimidazole, 1-methyl-2-methylimidazole, 1-benzyl-2-methylimidazole, 1-ethyl-4-methylimidazole, N-methylpyrrole, N-ethylpyrrole, N-butylpyrrole, N-methylpyrroline, N-ethylpyrroline, N-butylpyrroline, purine, quinoline, isoquinoline, N-methylcarbazole, N-ethylcarbazole and N-butylcarbazole.

The roughness regulator (ingredient D) includes a nitrogen-containing heterocyclic quaternary ammonium salt or a derivative thereof.

The roughness regulator (ingredient D) improves gloss (luster) and evenness of the copper foil 102. The roughness regulator (ingredient D) may have a concentration of 1 to 30 ppm in the electrolyte 11.

When the concentration of the roughness regulator (ingredient D) is less than 1 ppm, the effects of improving gloss (luster) and evenness of the copper foil 102 may not be obtained. On the other hand, when the concentration of the roughness regulator (ingredient D) is higher than 30 ppm, problems of non-uniform surface luster and rapidly increased surface roughness may occur in the direction of the first surface S1, that is, the matte surface MS of the copper foil 100 and it may be difficult to secure the desired roughness range. More specifically, the roughness regulator (ingredient D) may have a concentration of 3 to 20 ppm in the electrolyte 11.

The roughness regulator (ingredient D) may include at least one of the compounds represented by the following Formulae 1 to 5:

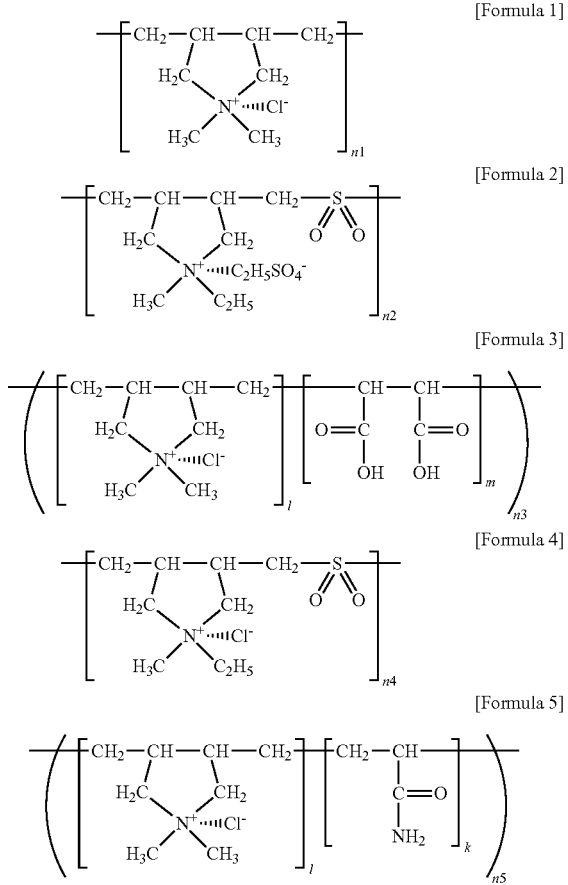

wherein j, k, l, m and n1 to n5 each represent repeat units, are an integer of 1 or higher and are identical to or different from one another.

According to an embodiment of the present disclosure, the compounds represented by Formulae 1 to 5 may each have a number average molecular weight of 500 to 50,000.

When the number average molecular weight of compounds represented by Formulae 1 to 5 used as the roughness regulator is less than 500, surface roughness of the copper foil 102 is increased due to high ratio of monomers. When the content of the roughness regulator is low, luster and evenness may be deteriorated due to high surface roughness of the matte surface of the copper layer 110.

When the number average molecular weight of the compounds represented by Formulae 1 to 5 is higher than 50,000, the surface roughness deviation of the copper foil 102 is increased. In this case, although the concentration of other additives is controlled, it is difficult to suppress an increase in surface roughness deviation in the direction of the matte surface of the copper foil 102.

The compounds represented by Formulae 1 to 5 may, for example, be prepared by polymerization or copolymerization using diallyl dimethyl ammonium chloride (DDAC).

The compound represented by Formula 1 may be PAS-H-1L (MW 8500, Nitto Boseki Co., Ltd.) or the like.

The compound represented by Formula 2 may be, for example, PAS-2451 (MW 30,000, Nitto Boseki Co., Ltd.), PAS-2401 (MW 2,000, Nitto Boseki Co., Ltd.) or the like.

The compound represented by Formula 3 may be, for example, PAS-2351 (MW 25,000, Nitto Boseki Co., Ltd.) or the like.

The compound represented by Formula 4 may be, for example, PAS-A-1 (MW 5,000, Nitto Boseki Co., Ltd.), RAS-A-5 (MW 4,000, Nitto Boseki Co., Ltd.) or the like.

The compound represented by Formula 5 may be, for example, PAS-J-81L (MW 10,000, Nitto Boseki Co., Ltd.), PAS-J-41 (MW 10,000, Nitto Boseki Co., Ltd.) or the like.

As the concentration of TOC in the electrolyte 11 increases, the amount of carbon (C) incorporated into the copper layer 110 increases, which causes an increase in the total amount of elements detached from the copper layer 110 during heat-treatment and thus deterioration in the strength of the copper foil 102.

According to an embodiment of the present disclosure, by controlling the concentration of the organic additive, in particular, the organic additive including nitrogen (N) or sulfur (S), a predetermined amount of carbon (C), hydrogen (H), nitrogen (N) or sulfur (S) can be incorporated into the copper layer 110. This incorporation enables the crystal orientation of the copper layer 110 to be regulated.

The step of forming the copper layer may include at least one of filtering the electrolyte through activated carbon, filtering the electrolyte through diatomite, and treating the electrolyte with ozone ($O_3$).

Specifically, so as to filter the electrolyte 11, the electrolyte 11 may be circulated at a flow rate of 35 to 45 m³/hour. That is, in order to remove solid impurities present in the electrolyte 11 during electroplating to form the copper layer 110, the filtering may be conducted at a flow rate of 35 to 45 m³/hour. At this time, activated carbon or diatomite may be used.

In order to maintain clearness of the electrolyte 11, the electrolyte 11 may be treated with ozone ($O_3$).

In addition, in order to maintain clearness of the electrolyte 11, a copper (Cu) wire used as a raw material for the electrolyte 11 may be cleaned.

According to an embodiment of the present disclosure, the step of preparing an electrolyte may include heat-treating a copper wire, cleaning the heat-treated copper wire with an acid, cleaning the acid-cleaned copper wire with water, and injecting the water-cleaned copper wire into sulfuric acid for an electrolyte.

More specifically, in order to maintain clearness of the electrolyte 11, a Cu wire with a high purity (99.9% or more) is heat-treated in an electric furnace at 750° C. to 850° C. to burn various organic impurities present on the Cu wire, the heat-treated Cu wire is acid-cleaned with a 10% sulfuric acid solution for 10 to 20 minutes, and the acid-cleaned Cu wire is then water-cleaned with distilled water, thereby obtaining a copper for manufacturing the electrolyte 11. The water-cleaned Cu wire is injected into sulfuric acid for an electrolyte to produce an electrolyte 11.

According to an embodiment of the present disclosure, so as to satisfy the requirements for the copper foil 102, the concentration of total organic carbon (TOC) in the electrolyte 11 is adjusted to 200 ppm or less. That is, the electrolyte 11 may have a total organic carbon (TOC) concentration of 200 ppm or less.

The copper layer 110 thus produced may be cleaned in a cleaning bath 20.

For example, acid cleaning to remove impurities, for example, resin ingredients or natural oxide on the surface of the copper layer 110 and water cleaning to remove the acidic solution used for acid cleaning may be sequentially conducted. The cleaning process may be omitted.

Then, anticorrosive layers 211 and 212 are formed on the copper layer 110.

Referring to FIG. 7, the copper layer 110 is dipped in an anticorrosive liquid 31 contained in an anticorrosion bath 30, to form anticorrosive layers 211 and 212 on the copper layer 110. Here, the anticorrosive liquid 31 includes chromium and chromium (Cr) may be present in the form of an ion in the anticorrosive liquid 31.

The anticorrosive liquid 31 may include 1 to 10 g/L of chromium. So as to form the anticorrosive layers 211 and 212, the temperature of the anticorrosive solution 31 can be maintained at 20 to 40° C. The copper layer 110 may be dipped in the anticorrosive liquid 31 for about 1 to about 30 seconds.

Meanwhile, the anticorrosive layers 211 and 212 may include a silane compound via treatment with silane and a nitrogen compound via treatment with nitrogen.

The copper foil 200 is produced by formation of these anticorrosive layers 211 and 212.

Then, the copper foil 200 is cleaned in a cleaning bath 40. Such a cleaning process may be omitted.

Then, a drying process is preformed and the copper foil 200 is then wound on a winder (WR).

Hereinafter, the present disclosure will be described in more detail with reference to Production examples and Comparative Examples. The following Production examples and Comparative Examples are only provided only for better understanding of the present disclosure and should not be construed as limiting the scope of the present disclosure.

Production Examples 1-4 and Comparative Examples 1-4

A copper foil was produced using a foil making machine which included an electrolytic bath 10, a rotary electrode drum 12 disposed in the electrolytic bath 10, and an electrode plate 13 spaced from the rotary electrode drum 12. The electrolyte 11 was a copper sulfate solution, the copper ion concentration of the electrolyte 11 was 87 g/L, a sulfuric acid concentration was 110 g/L, the temperature of the electrolyte 11 was maintained at 55° C. and current density was set at 60 ASD.

In addition, concentrations of arsenic (As) ions ($As^{3+}$), chlorine (Cl) and organic additive included in the electrolyte 11 are shown in the following Table 1.

Regarding the organic additive, the polishing agent (ingredient A) used herein was bis-(3-sulfopropyl)-disulfide disodium salt (SPS), the speed reducer (ingredient B) used herein was polyethylene glycol (PEG), the leveling agent (ingredient C) used herein was ethylene thiourea (ETU) and N-ethyl thiourea (NETU), and the roughness regulator (ingredient D) used herein was a triaryl methyl ethyl ammonium ethyl sulfide maleic acid copolymer (PAS-2451™, Nitto Boseki Co., Ltd., MW. 30,000).

A current density of 60 ASD was applied between the rotary electrode drum 12 and the electrode plate 13 to form a copper layer 110. Then, the copper layer 110 was dipped in an anticorrosive liquid for about 2 seconds to treat the surface of the copper layer 110 with chromium, to thereby form anticorrosive layers 211 and 212. As a result, a copper foil 102 was produced. An anticorrosive liquid including chromium (Cr) as a main ingredient was used as the anticorrosive liquid 31, and the concentration of chromate was 5 g/L.

As a result, copper foils according to Production examples 1-4 and Comparative Examples 1-4 were produced.

TABLE 1

|  | $As^{3+}$ (g/L) | Cl (ppm) | SPS (ingredient A) (ppm) | PEG (ingredient B) (ppm) | ETU (ingredient C) (ppm) | NETU (ingredient C) (ppm) | PAS-2451 (ingredient D) (ppm) |
| --- | --- | --- | --- | --- | --- | --- | --- |
| Production example 1 | 0.3 | 17 | 5 | 15 | 1 | — | 5 |
| Production example 2 | 1 | 22 | 25 | 30 | — | 10 | — |
| Production example 3 | 0.6 | 5 | — | — | — | 2 | — |
| Production example 4 | 1.9 | 45 | 10 | 12 | 8 | — | — |
| Comparative Example 1 | 2.1 | 20 | 5 | 15 | 22 | — | 10 |
| Comparative Example 2 | 0.5 | 18 | 55 | 35 | — | — | 35 |
| Comparative Example 3 | 1.2 | 5 | — | — | — | 25 | — |

TABLE 1-continued

|  | AS³⁺ (g/L) | Cl (ppm) | SPS (ingredient A) (ppm) | PEG (ingredient B) (ppm) | ETU (ingredient C) (ppm) | NETU (ingredient C) (ppm) | PAS-2451 (ingredient D) (ppm) |
|---|---|---|---|---|---|---|---|
| Comparative Example 4 | 2.5 | 70 | 15 | 15 | 3 |  | 5 |

ETU: Ethylene thiourea
NETU: (N-ethyl thiourea)
PAS-2451: triaryl methyl ethyl ammonium ethyl sulfide maleic acid copolymer (Nitto Boseki Co., Ltd., MW 30,000)

(i) Residual stress, (ii) ratio [TCR(220)] of texture coefficient of (220) plane [TC(220)], (iii) elongation after heat-treating, (iv) difference in surface roughness Ra between first and second surfaces of the copper foil, and (v) curl of the copper foil, of the copper foils of Production examples 1-4 and Comparative Examples thus produced were measured.

In addition, secondary batteries were manufactured using the copper foils, were charged and discharged, were then disassembled, and (vi) whether or not wrinkles occurred was observed.

(i) Measurement of Residual Stress

Residual stress of the copper foils was measured using X-ray diffraction (XRD). More specifically, the residual stress of each crystal plane was measured using X-ray diffraction (XRD) of the crystal plane of the copper layer 110.

X-ray diffraction analysis conditions regarding the copper foil at room temperature are given below:

Measurement device (model name): Bruker D8 DISCOVER
Target: 3 kW X-ray tube with Cu target
Power: 40 kV, 40 mA
Wavelength: 1.5406 Å
Measurement range: 30 to 100 degrees
Scan axis: Theta-2Theta
Scan speed: 2 deg/min Specifically, residual stress measurement conditions of crystal planes of the copper layer 110 constituting the copper foil are shown in the following Table 2.

TABLE 2

| Anode material | Cu |
|---|---|
| K-Alpha1 wavelength | 1.540598 |
| K-Alpha2 wavelength | 1.544426 |
| Ratio K-Alpha2/K-Alpha1 | 0.5 |
| Divergence slit | Fixed 3.00 mm |
| Monochromator used | YES |
| Generator voltage | 40 |
| Tube current | 20 |
| Scan axis | Psi |
| Scan range | −74.75 to 74.75 |
| Scan step size | 0.5 |
| No. of points | 299 |
| Scan type | CONTINUOUS |
| 2Theta | 89.9805 |
| Omega | 44.9903 |
| Phi | 0 |
| X | 2 |
| Y | 4 |
| Z | 9.175 |
| Time per step | 3 |

(ii) Measurement of Ratio [TCR(220)] of Texture Coefficient of (220) Plane [TC(220)]

The ratio [TCR(220)] of a texture coefficient (TC) of (220) plane [TC(220)] to a total of texture coefficients (TC) of (111), (200), (220) and (311) planes, which were crystal planes of the copper layer 110 constituting the copper foils produced in Production examples 1-4 and Comparative Examples 1-4, was measured.

First, an XRD graph having peaks corresponding to n crystal planes was obtained by X-ray diffraction (XRD) within a diffraction angle (2θ) range of 30° to 95° [Target: Copper K alpha 1, 2θ interval: 0.01°, 28 scan speed: 3°/min]. Referring to FIG. 2A, in the case of the copper layer 110, an XRD graph including four peaks corresponding to (111), (200), (220) and (311) planes was obtained. In this case, n was 4.

Then, from this graph, XRD diffraction intensity [I(hkl)] of each crystal plane (hkl) was obtained. Subsequently, XRD diffraction intensities [I₀(hkl)] of n respective crystal planes of a standard copper powder regulated by Joint Committee On Powder Diffraction Standards (JCPDS) were obtained. Subsequently, the arithmetic mean value of "I(hkl)/I₀(hkl)" of n crystal planes was calculated and I(111)/I₀(111) of the (111) plane was divided by the arithmetic mean value to calculate the texture coefficient of (111) plane [TC(111)]. That is, the texture coefficient of (111) plane [TC(111)] was calculated based on the following Equation 1:

$$TC(111) = \frac{\frac{I(111)}{I_0(111)}}{\frac{1}{n}\sum \frac{I(hkl)}{I_0(hkl)}} \qquad \text{[Equation 1]}$$

In the same manner, the texture coefficient of (200) plane [TC(200)] was calculated based on the following Equation 2:

$$TC(200) = \frac{\frac{I(200)}{I_0(200)}}{\frac{1}{n}\sum \frac{I(hkl)}{I_0(hkl)}} \qquad \text{[Equation 2]}$$

In the same manner, the texture coefficient of (220) plane [TC(220)] was calculated based on the following Equation 3:

$$TC(220) = \frac{\frac{I(220)}{I_0(220)}}{\frac{1}{n}\sum \frac{I(hkl)}{I_0(hkl)}} \qquad \text{[Equation 3]}$$

In the same manner, the texture coefficient of (311) plane [TC(311)] is calculated based on the following Equation 4:

$$TC(311) = \frac{\frac{I(311)}{I_0(311)}}{\frac{1}{n}\Sigma\frac{I(hkl)}{I_0(hkl)}} \quad \text{[Equation 4]}$$

Then, a ratio TCR(220) of a texture coefficient (TC) of (220) crystal plane of the copper layer to a total of texture coefficients (TC) of (111), (200), (220) and (311) planes of crystal planes of the copper layer 110 was calculated in accordance with the following Equation 5:

$$TCR(220) = \frac{TC(220)}{TC(111) + TC(200) + TC(220) + TC(311)} \quad \text{[Equation 5]}$$

(iii) Measurement of Elongation After Heat-Treatment

The elongations of the copper foils 101 produced in Production examples 1-4 and Comparative Examples 1-4 were measured after heat-treatment at 130° C. for 30 minutes.

The elongation was measured with a universal testing machine (UTM) in accordance with the regulations of the IPC-TM-650 test method manual. Specifically, the elongation was measured with a universal testing machine available from Instron corporation. At this time, the width of a sample for measuring elongation was 12.7 mm, the distance between grips was 50 mm and the measurement speed was 50 mm/min.

(iv) Difference (Δ Ra) in Surface Roughness Ra Between First and Second Surfaces of Copper Foil Surface roughness (Ra) of the first surface S1 and the second surface S2 of the copper foils produced in Production examples 1-4 and Comparative Examples 1-4 was measured using a surface roughness measurement device (M300, Mahr) in accordance with the specifications of JIS B 0601-2001. The difference (Δ Ra) in surface roughness Ra between the first surface S1 and the second surface S2 of the copper foil was calculated using the measured results.

(v) Measurement of Curl of Copper Foil

The copper foils produced in Production examples 1-4 and Comparative Examples 1-4 were cut in a width direction to produce samples (30 cm×30 cm). Each sample was disposed on a support such that a first surface S1 disposed in the direction of a matte surface MS of the sample was directed upward and the height of the sample from the support was measured. An average of heights measured at four spots of the sample was calculated and a curl value of copper foil was determined.

(vi) Observation of Wrinkles and Tears

1) Anode Production 100 parts by weight of a commercially available silicon/carbon composite anode material for an anode active material was mixed with 2 parts by weight of styrene butadiene rubber (SBR) and 2 parts by weight of carboxymethyl cellulose (CMC), and a slurry for an anode active material was prepared using distilled water as a solvent. Copper foils with a width of 10 cm produced in Production examples 1-4 and Comparative Examples 1-4 were coated to a thickness of 40 μm with the slurry for an anode active material using a doctor blade, dried at 120° C., and pressed at a pressure of 1 ton/cm² to produce an anode for secondary batteries.

2) Electrolyte Production $LiPF_6$ as a solute was dissolved at a concentration of 1M in a non-aqueous organic solvent consisting of ethylene carbonate (EC) and ethyl methyl carbonate (EMC) mixed in a ratio of 1:2 to prepare a basic electrolyte. 99.5% by weight of the basic electrolyte was mixed with 0.5% by weight of succinic anhydride to prepare a non-aqueous electrolyte.

3) Cathode Production

Lithium manganese oxide ($Li_{1.1}Mn_{1.85}Al_{0.05}O_4$) was mixed with lithium manganese oxide (o-$LiMnO_2$) having an orthorhombic crystal structure in a weight ratio of 90:10 to produce a cathode active material. The cathode active material, carbon black, and PVDF [poly(vinylidene fluoride)] as a binder were mixed in a weight ratio of 85:10:5, and the resulting mixture was mixed with NMP as an organic solvent to prepare a slurry. Both surfaces of an Al foil with a thickness of 20 μm were coated with the slurry thus prepared and then dried to produce a cathode.

4) Production of Lithium Secondary Battery for Testing

The cathode and the anode were disposed in an aluminum can such that the cathode and the anode were insulated with the aluminum can, and a non-aqueous electrolyte and a separator were disposed therebetween to produce a coin-type lithium secondary battery. The separator used herein was polypropylene (Celgard 2325; thickness: 25 μm, average pore size: 028 nm, porosity: 40%).

5) Charge/Discharge of Secondary Battery

The lithium secondary battery thus produced was operated at a charge voltage of 4.3V and a discharge voltage of 3.4V and were subjected to 100 charge-discharge cycles at a high temperature of 50° C. at a current rate (C-rate) of 0.2C.

6) Observation of Occurrence of Wrinkles or Tears

After 100 charge/discharge cycles, the lithium secondary battery was disassembled and whether or not wrinkles or tears occurred in the copper foil was observed. In particular, a case in which wrinkles or tears occurred is designated as "occurrence", while a case in which wrinkles or tears did not occur was designated as "no".

Test results are shown in Tables 3 and 4 below.

TABLE 3

| Item | Residual stress (Mpa) | | | | TCR (220) (%) | Elongation after heat-treatment |
| --- | --- | --- | --- | --- | --- | --- |
| | (111) plane | (200) plane | (220) plane | (311) plane | | |
| Example 1 | 2.9 | 2.4 | 2.4 | 2.2 | 15.4 | 8.6 |
| Example 2 | 16.2 | 15.7 | 16.1 | 15.1 | 7.9 | 6.5 |
| Example 3 | 7.8 | 8.9 | 7.9 | 8.2 | 22.2 | 5.8 |
| Example 4 | 23.1 | 23.5 | 22.5 | 24.3 | 19.3 | 3.6 |
| Comparative Example 1 | 27.1 | 16.6 | 17.6 | 17.2 | 2.1 | 2.9 |
| Comparative Example 2 | 33.1 | 28.8 | 29.9 | 31.1 | 7.7 | 3.4 |
| Comparative Example 3 | 25.5 | 28.2 | 27.1 | 27.2 | 14.6 | 1.9 |
| Comparative Example 4 | −7.7 | −8.1 | −7.9 | −8.3 | 2.6 | 2.4 |

TABLE 4

| Item | Ra of first surface (μm) | Ra of second surface (μm) | ΔRa (μm) | Curl (mm) | Wrinkle | Tear |
|---|---|---|---|---|---|---|
| Example 1 | 0.26 | 0.24 | 0.02 | 10 | No | No |
| Example 2 | 0.27 | 0.25 | 0.02 | 8 | No | No |
| Example 3 | 0.24 | 0.25 | 0.01 | 18 | No | No |
| Example 4 | 0.26 | 0.27 | 0.01 | 9 | No | No |
| Comparative Example 1 | 0.31 | 0.19 | 0.12 | 19 | No | Occurrence |
| Comparative Example 2 | 0.66 | 0.14 | 0.52 | 26 | Occurrence | Occurrence |
| Comparative Example 3 | 0.33 | 0.22 | 0.11 | Curled | No | Occurrence |
| Comparative Example 4 | 0.28 | 0.26 | 0.02 | 5 | Occurrence | Occurrence |

The following results can be seen from Tables 1, 3 and 4.

The copper foil of Comparative Example 1 produced from the electrolyte including excessive amounts of arsenic (As) ions and the leveling agent (ingredient C) was torn.

The copper foil of Comparative Example 2 produced from the electrolyte including excessive amounts of polishing agent (ingredient A) and roughness regulator (ingredient D) had a high residual stress and was both curled and torn.

The copper foil of Comparative Example 3 produced from the electrolyte including only an excessive amount of leveling agent (ingredient C) as an organic additive had a high residual stress, and was both curled and torn.

The copper foil of Comparative Example 4 produced from the electrolyte including excessive amounts of arsenic (As) ions and chlorine (Cl) was wrinkled and torn.

On the other hand, copper foils of Production examples 1-4 according to the present disclosure showed a curl of 20 mm or less, and were neither wrinkled nor torn.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

REFERENCE NUMERALS 101, 102: copper foil
211, 212: anticorrosive layer
310, 320: active material layer
103: 104: electrode for secondary batteries
MS: matte surface
SS: shiny surface

What is claimed is:

1. A copper foil comprising:
a copper layer having a matte surface and a shiny surface; and
an anticorrosive layer disposed on the copper layer,
wherein the copper foil has a residual stress of 0.5 to 25 Mpa, based on absolute value, and
the copper layer has a plurality of crystal planes,
wherein a ratio [TCR(220)] of a texture coefficient (TC) of (220) crystal plane of the copper layer to a total of texture coefficients (TC) of (111), (200), (220) and (311) crystal planes of the copper layer is 5 to 30%,
wherein the copper foil has an elongation of 2 to 20% after heat-treatment at 130° C. for 30 minutes and
wherein the residual stress is measured in the (311) crystal plane.

2. The copper foil according to claim 1, wherein the copper foil has a first surface corresponding to the direction of the matte surface and a second surface corresponding to the direction of the shiny surface,
wherein a difference in surface roughness (Ra) between the first surface and the second surface is 0.5 μm or less.

3. The copper foil according to claim 1, wherein the copper foil has a thickness of 4 to 20 μm.

4. The copper foil according to claim 1, wherein the anticorrosive layer comprises at least one of chromium, a silane compound or a nitrogen compound.

5. An electrode for secondary batteries comprising:
a copper foil; and
an active material layer disposed on the copper foil,
wherein the copper foil is the copper foil according to claim 1.

6. A secondary battery comprising:
a cathode;
an anode facing the cathode;
an electrolyte disposed between the cathode and the anode to provide an environment enabling lithium ions to move; and
a separator to electrically insulate (isolate) the cathode from the anode,
wherein the anode comprises:
the copper foil according to claim 1; and
an active material layer disposed on the copper foil.

* * * * *